US008307216B2

(12) United States Patent
Okuyama

(10) Patent No.: US 8,307,216 B2
(45) Date of Patent: Nov. 6, 2012

(54) DEVICE AUTHENTICATION CONTROL METHOD, DEVICE AUTHENTICATION CONTROL DEVICE, AND BOAT

(75) Inventor: Takashi Okuyama, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 844 days.

(21) Appl. No.: 12/177,905

(22) Filed: Jul. 23, 2008

(65) Prior Publication Data

US 2009/0044255 A1    Feb. 12, 2009

(30) Foreign Application Priority Data

Aug. 10, 2007   (JP) .................................. 2007-209940

(51) Int. Cl.
*G06F 21/04* (2006.01)
*G06F 13/12* (2006.01)
(52) U.S. Cl. ......................... 713/192; 713/191; 709/225
(58) Field of Classification Search .................. None
See application file for complete search history.

(56) References Cited

U.S. PATENT DOCUMENTS

| | | | | |
|---|---|---|---|---|
| 7,024,692 | B1 * | 4/2006 | Schanze et al. ................ 726/10 |
| 7,266,585 | B2 * | 9/2007 | Kay et al. ...................... 709/206 |
| 7,330,782 | B2 * | 2/2008 | Graham et al. ................ 701/21 |
| 7,930,527 | B2 * | 4/2011 | Matsuoka et al. ............... 713/1 |
| 2001/0040702 | A1 * | 11/2001 | Leung ............................ 358/434 |
| 2003/0149874 | A1 * | 8/2003 | Balfanz et al. ................ 713/168 |
| 2003/0163714 | A1 * | 8/2003 | Nortung ........................ 713/189 |
| 2004/0057450 | A1 | 3/2004 | Okuyama |
| 2004/0107366 | A1 * | 6/2004 | Balfanz et al. ................ 713/201 |
| 2006/0068759 | A1 * | 3/2006 | Ikebe et al. ................... 455/411 |
| 2007/0015589 | A1 | 1/2007 | Shimizu et al. |
| 2009/0100515 | A1 * | 4/2009 | Masui ............................ 726/16 |

FOREIGN PATENT DOCUMENTS

| | | | |
|---|---|---|---|
| EP | 1453271 A1 * | 9/2004 |
| JP | 2004-048304 A | 2/2004 |
| JP | 2004-252823 A | 9/2004 |
| JP | 2007-027896 A | 2/2007 |

OTHER PUBLICATIONS

Official Communication issued in corresponding Japanese Patent Application No. 2007-209940, mailed on Jun. 21, 2012.
"Significance of a Cost Performance Test for an In-Vehicle LAN," Design Wave Magazine, CQ Publication Kabushiki Kaisha, vol. 11, Series 7, Jul. 1, 2006, pp. 75-77.

* cited by examiner

*Primary Examiner* — Venkat Perungavoor
(74) *Attorney, Agent, or Firm* — Keating & Bennett, LLP

(57) ABSTRACT

In a device authentication control method and device, when a connection device is connected to a network mounted on a boat, it is determined whether or not the connection device corresponds to an authentication-free device. If the connection device does not correspond to an authentication-free device, an authenticating action is performed on the connection device. If the connection device does correspond to an authentication-free device, the connection device is exempted from the authenticating action. In this way, when a connection device does not correspond to an authentication-free device, an authenticating action is performed, but when the connection device corresponds to an authentication-free device, the connection device is exempted from an authenticating action. As a result, it is possible to handle specific connection devices as authentication-free.

11 Claims, 4 Drawing Sheets

DEVICE AUTHENTICATION CONTROL METHOD, DEVICE AUTHENTICATION CONTROL DEVICE, AND BOAT

BACKGROUND OF THE INVENTION

1. Field of the Invention

The present invention relates to a device authentication control method and a device authentication control device preferably for use when a connection device is connected to a network mounted on a boat, and a boat including the device authentication control device.

2. Description of the Related Art

Conventionally, when a connection device is connected to a network mounted on a boat, the connection device performs an authenticating action so as to permit the connection device to function normally on the network (refer to, for example, JP-A-2004-252823).

The conventional method, however, has had a problem in that, because the authenticating action is performed irrespective of the manufacturer or device class of the connection device, it has become impossible to handle specific connection devices without an authentication step.

SUMMARY OF THE INVENTION

In order to overcome the problems described above, preferred embodiments of the present invention provide a device authentication control method, a device authentication control device, and a boat that make it possible to handle specific connection devices without requiring any authentication.

A preferred embodiment of the present invention provides a device authentication control method wherein, when a connection device is connected to a network mounted on a boat, after an authentication-free determination is made as to whether or not the connection device corresponds to an authentication-free device, an authenticating action is made when the connection device does not correspond to the authentication-free device, and the connection device is exempted from the authenticating action when the connection device corresponds to the authentication-free device.

According to another preferred embodiment of the present invention, in the authentication-free determination, whether or not the connection device corresponds to an authentication-free device is determined on a basis of a manufacturer code representing the manufacturer of the connection device.

Another preferred embodiment of the present invention provides a device authentication control device including a device determining section arranged to determine whether or not the connection device corresponds to an authentication-free device when the connection device is connected to a network mounted on a boat, an authentication executing section arranged to perform an authenticating action to the connection device when the connection device does not correspond to an authentication-free device, and an authentication exempting section arranged to exempt the connection device from the authenticating action when the connection device corresponds to an authentication-free device.

According to another preferred embodiment of the present invention, the device determining section preferably makes a determination of whether or not the connection device corresponds to an authentication-free device on the basis of a manufacturer code representing the manufacturer of the connection device.

Another preferred embodiment of the present invention is a boat including the above device authentication control device.

According to another preferred embodiment of the present invention, when a connection device is connected to a network, an authenticating action is preferably performed if the connection device does not correspond to an authentication-free device. Additionally, the connection device is exempted from the authenticating action if the connection device corresponds to an authentication-free device. As a result, it is possible to handle specific connection devices (authentication-free devices) in an authentication-free manner.

According to another preferred embodiment of the present invention, because the authentication-free determination is made on the basis of the manufacturer code, the connection device is handled as authentication-free when the connection device is manufactured by a specific manufacturer.

According to another preferred embodiment of the present invention, it is possible, when a connection device is connected to a network, to make an authenticating action if the connection device does not correspond to an authentication-free device, and to exempt the connection device (authentication-free device) from the authenticating action if the connection device corresponds to an authentication-free device. Therefore, it is possible to handle specific devices (authentication-free devices) as authentication-free.

According to another preferred embodiment of the present invention, because it is possible to make the authentication-free determination on the basis of the manufacturer code, it is possible to handle the connection device as authentication-free when the connection device is manufactured by the specific manufacturer.

Other features, elements, steps, characteristics, and advantages of the present invention will become more apparent from the following description of some preferred embodiments of the present invention with reference to the attached drawings.

DETAILED DESCRIPTION OF PREFERRED EMBODIMENTS

Preferred embodiments of the present invention will hereinafter be described.

First Preferred Embodiment

FIGS. 1 to 4 show a first preferred embodiment of the present invention.

Figure 1:
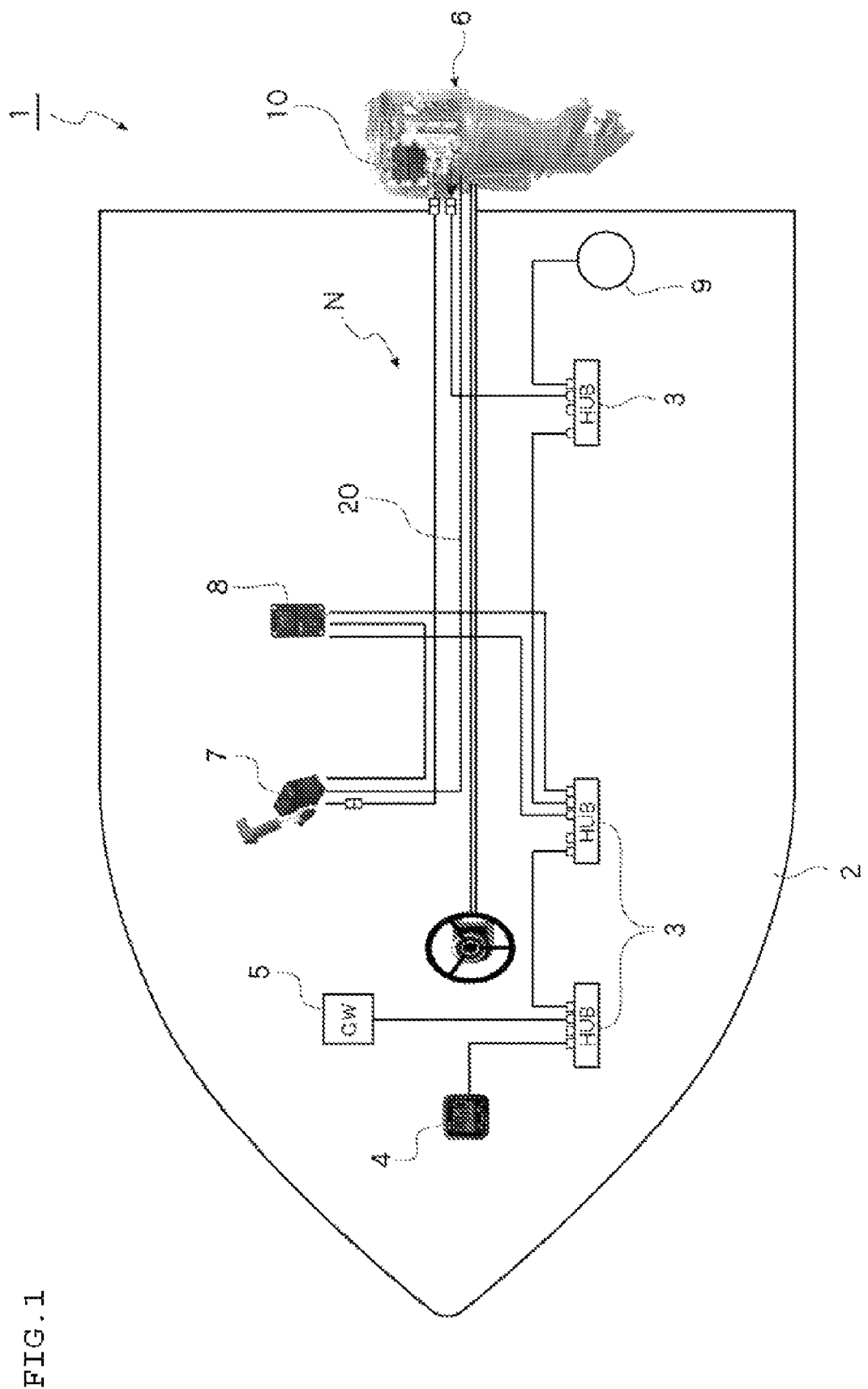
FIG. 1 is a schematic view of a boat related to a preferred embodiment of the present invention.

First, the constitution of the system will be described. As shown in FIG. 1, a boat 1 has a hull 2. An outboard motor 6 is detachably attached to the rear portion (stern) of the hull 2. The outboard motor 6 preferably has a built-in engine ECU 10. The hull 2 includes, for example, three hubs 3. Various connection devices including, for example, a gauge 4, a gateway 5, a remote control 7, an immobilizer 8, and a multi-function sensor 9, are connected through these hubs 3 to a network N. The outboard motor 6 and the remote control 7 are interconnected through a type of connection using a mechanical cable 20.

Figure 2:
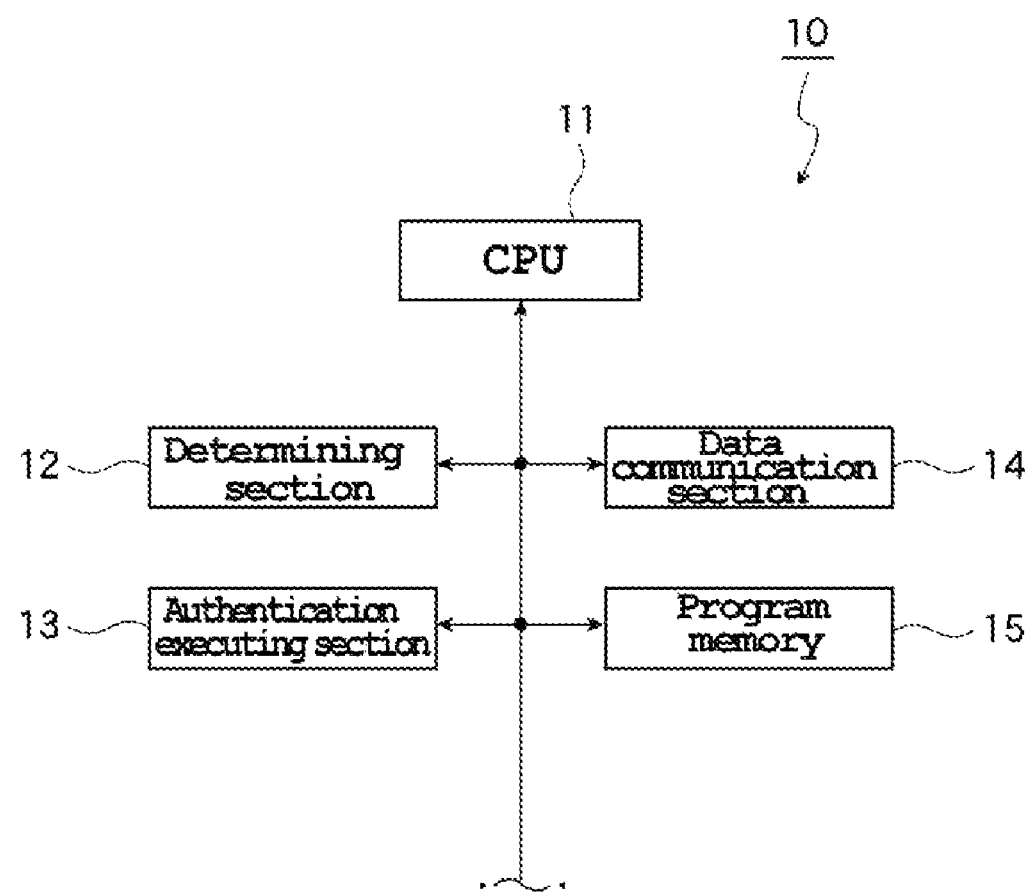
FIG. 2 is a block diagram of the engine ECU related to a preferred embodiment of the present invention.
Figure 3:
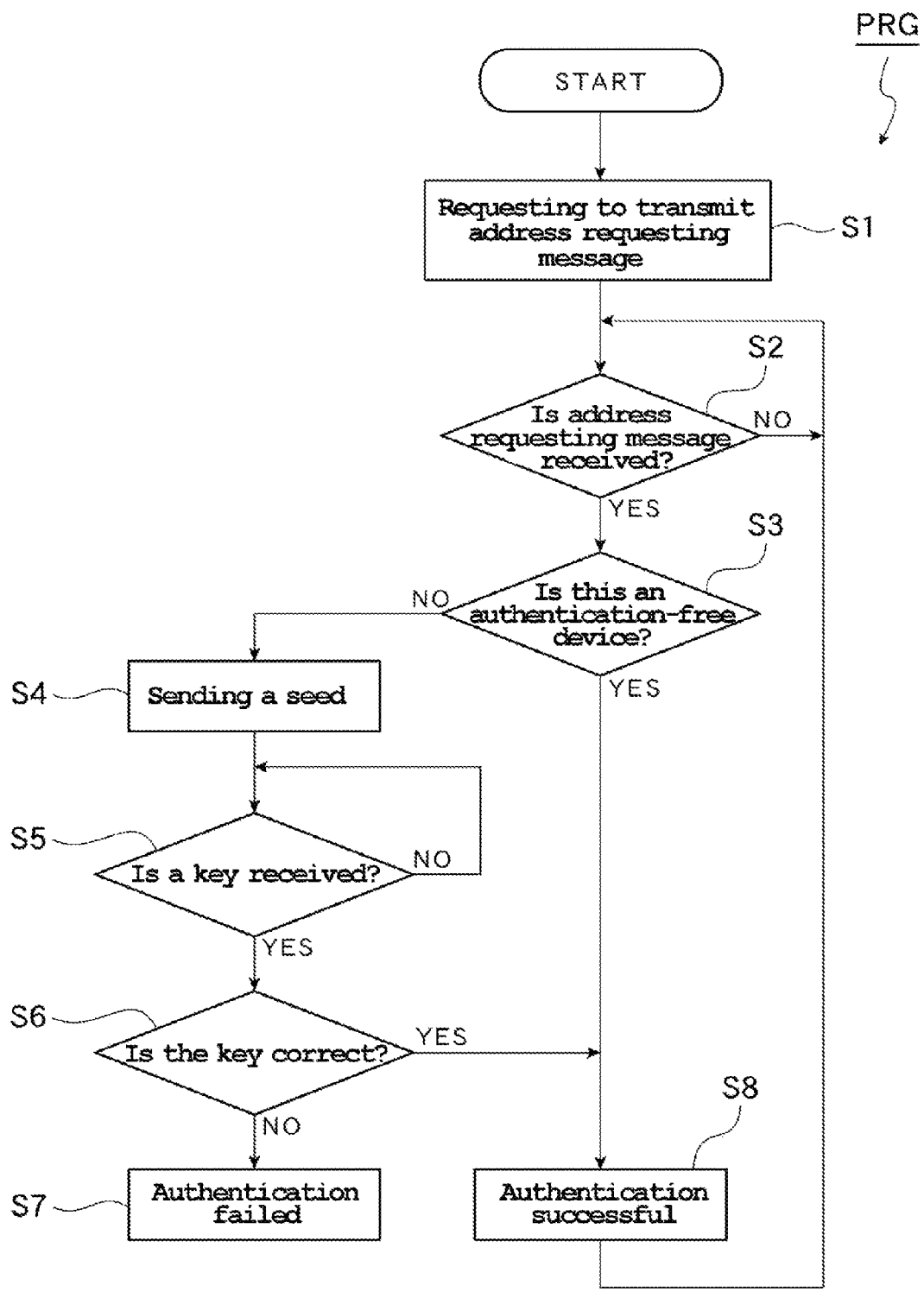
FIG. 3 is a flowchart of a device authentication control program related to a preferred embodiment of the present invention.

As shown in FIG. 2, the engine ECU 10 also has a CPU 11 to which are connected a determining section 12, an authentication executing section 13, a data communication section 14, and a program memory 15. Furthermore, the program memory 15 stores a device authentication control program PRG, which is shown in FIG. 3, to be freely readable.

Next, the functions of the system will be described.

In the boat 1 having the above described constitution, when the gauge 4 is connected to the network N, the CPU 11 of the engine ECU 10 reads out a device authentication control program PRG shown in FIG. 3 from the program memory 15, and executes an device authentication control action according to the above-mentioned device authentication control program PRG as described below.

First, the CPU 11 instructs the data communication section 14 to request a transmission of an address requesting message M to the gauge 4. Accordingly, the data communication section 14 requests the gauge 4, through the network N, to transmit the address requesting message M (step S1 of the device authentication control program PRG).

Figure 4:
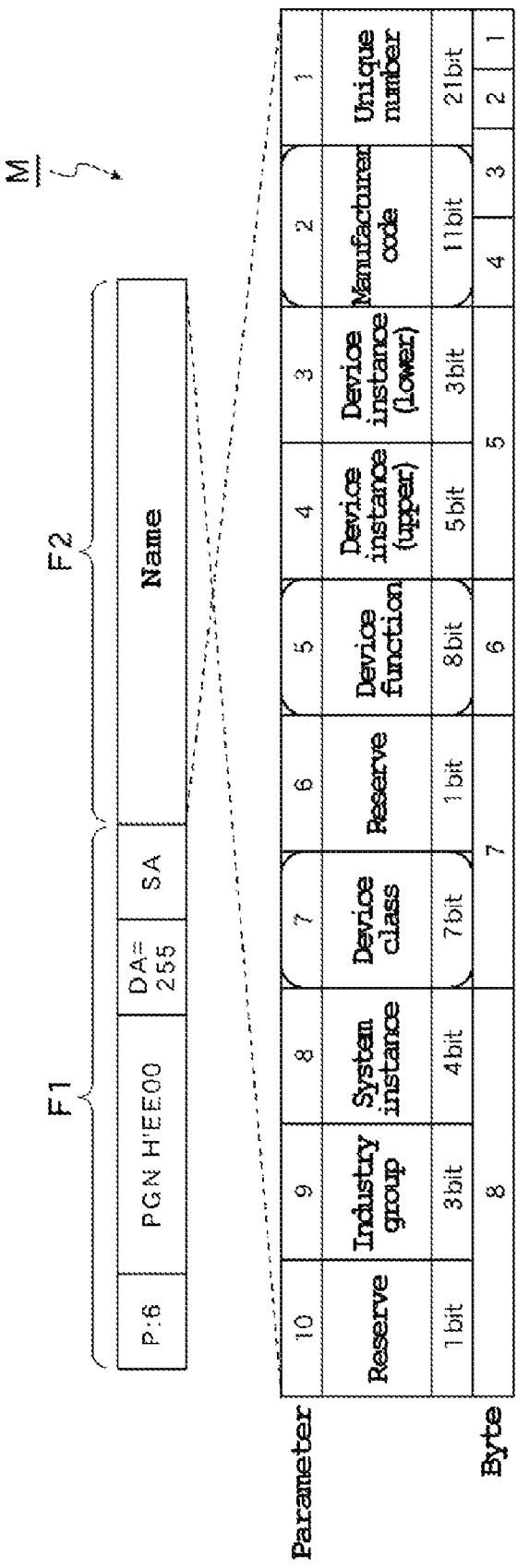
FIG. 4 is a schematic view exemplifying an address requesting message related to a preferred embodiment of the present invention.

The address requesting message M is made up, as shown in FIG. 4, of an identification field F1 and a data field F2. In the identification field F1, identification information such as P (priority), PGN (communication ID), DA (destination address), and SA (source address) is stored. In the data field F2, various kinds of device information such as manufacturer codes, device classes, and device functions are stored. Here, the term "manufacturer code" refers to a dedicated number (such as "1862") representing the manufacturer of the gauge 4.

Then, the gauge 4, in response to the request, transmits the address requesting message M through the network N to the data communication section 14. Then, the data communication section 14 checks reception of the address requesting message M (step S2 of the device authentication control program PRG).

Then, the data communication section 14, upon receipt of the address requesting message M, outputs a receipt confirmation signal to the CPU 11. Then, the CPU 11 instructs a determining section 12 to make an authentication-free determination of the gauge 4. Upon receipt of this, the determining section 12, based on the manufacturer code included in the address requesting message M, makes a determination as to whether or not the gauge 4 corresponds to an authentication-free device; in other words, an authentication-free determination (step S3 of the device authentication control program PRG). In the present preferred embodiment, the authentication-free device means a connection device manufactured by a specific manufacturer.

In other words, when the manufacturer code in the address requesting message M matches a specific number, the gauge 4 is deemed to have been manufactured by the manufacturer corresponding to the specific number. Accordingly, the gauge 4 is determined to correspond to the authentication-free device. However, when the manufacturer code in the address requesting message M does not match the specific number, the gauge 4 is deemed not to have been manufactured by the manufacturer corresponding to the specific number. In this case, the gauge 4 is determined not to correspond to the authentication-free device. The determining section 12, after determining that the gauge 4 does not correspond to an authentication-free device, outputs a signal to that effect to the CPU 11. Then, the CPU 11 instructs the authentication executing section 13 to perform an authenticating action for the gauge 4. Upon receipt of this instruction, the authentication executing section 13 performs the authenticating action for the gauge 4.

In other words, the authentication executing section 13 transmits a seed to the gauge 4 through the network 4 (step S4 of the device authentication control program PRG) to make a key reception check (step S5 of the device authentication control program PRG). Upon receipt of the key, the authentication executing section 13 makes a determination of whether or not the key is correct, that is, whether or not it corresponds to the above-mentioned seed (step S6 of the device authentication control program PRG).

When the key is determined to be correct, the authentication executing section 13 outputs a confirmation signal to the CPU 11. The CPU 11 then recognizes a successful authentication and permits unlimited communication with the gauge 4 (step S8 of the device authentication control program PRG). As a result, the gauge 4 operates normally over the network N. When the key is determined to be incorrect, the authentication executing section 13 outputs a signal to that effect to the CPU 11. The CPU 11 recognizes a failed authentication and causes a warning lamp (not shown), which indicates an abnormality in authentication, to light up while also prohibiting data communication with the gauge 4 (step S7 of the device authentication control program PRG). As a result, the gauge 4 cannot function normally over the network N.

On the other hand, when the gauge 4 is determined to correspond to an authentication-free device in the above-mentioned authentication-free determination (step S3 of the device authentication control program PRG), the determining section 12 outputs a confirmation signal to the CPU 11. The CPU then exempts the gauge 4 from an authenticating action (steps S4 to S6 of the device authentication control program PRG) to permit unlimited data communication with the gauge 4. As a result, the gauge 4 becomes normally operative over the network N even if it does not conform to an authentication compliant device (a connection device conformed to a protocol for executing authentication).

Here, the device authentication control action according to the device authentication control program PRG is terminated.

The gauge 4 is described as an example of a connection device connected to the network N. If a connection device other than the gauge 4 (for example, a gateway 5, remote control 7, immobilizer 8, or multi-function sensor 9) is connected, the device authentication control action according to the device authentication control program PRG is performed in a similar manner.

As described above, when a connection device such as the gauge 4 is connected to the network N, and if it does not correspond to an authentication-free device, an authenticating action is performed. In contrast, when the connection device corresponds to an authentication-free device, the device is exempted from the authenticating action. As a result, it is possible to handle specific connection devices (authentication-free devices) as authentication-free.

Furthermore, because the authentication-free determination is made according to the manufacturer code included in the address requesting message M, when a connection device such as the gauge 4 is one made by a specific manufacturer, the connection device may be handled as being authentication-free.

Other Preferred Embodiments

The first preferred embodiment described above preferably is for a case in which an authentication-free determination is made on the basis of the manufacturer code in the address requesting message M while defining the authentication-free device to be a connection device manufactured by a specific manufacturer. However, the definition of the authentication-free device is not limited to the above. For example, it is also possible to make an authentication-free determination based on a device class contained in the address requesting message M while defining the authentication-free device to be a connection device belonging to a specific device class. Alternatively, the authentication-free determination may be made on any other suitable basis.

The first preferred embodiment above describes a boat 1 in which an outboard motor 6 preferably is connected to a remote control 7 by a mechanical cable 20. It is also possible to apply the preferred embodiments of the present invention to a boat 1 of a DBW (drive-by-wire) type in which the engine ECU 10 is electrically connected to the ECU of the remote control 7 through a LAN (Local Area Network). In particular to a DBW type boat 1, it is also possible that an ECU of the remote control 7 executes the device authentication control action in place of the engine ECU 10.

Additionally, although the above described preferred embodiments are for a boat 1 in which an outboard motor 6 preferably is attached to the hull 2, it is also possible to apply the preferred embodiments of the present invention to a boat 1 in which a boat propelling device other than the outboard motor 6 (for example, an inboard-outboard motor) is attached to the hull 2.

The preferred embodiments of the present invention may be widely applied to various types of boats such as a pleasure boat, a small hydroplane, a personal watercraft and other water vehicles or marine vessels.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A device authentication control method comprising the steps of:
   connecting a connection device to a network;
   making an authentication-free determination with respect to the connection device;
   after the authentication-free determination is made, determining whether or not the connection device corresponds to an authentication-free device; and
   if the connection device does not correspond to an authentication-free device, performing an authenticating action with respect to the connection device; or
   if the connection device corresponds to an authentication-free device, exempting the connection device from the authenticating action; wherein
   during the authentication-free determination, it is determined whether or not the connection device corresponds to an authentication-free device based on a manufacturer code representing the manufacturer of the connection device.

2. The device authentication control method of claim 1, wherein the manufacturer code is included in an address requesting message sent by the connection device.

3. A device authentication control method comprising the steps of:
   connecting a connection device to a network;
   making an authentication-free determination with respect to the connection device;
   after the authentication-free determination is made, determining whether or not the connection device corresponds to an authentication-free device; and
   if the connection device does not correspond to an authentication-free device, performing an authenticating action with respect to the connection device; or
   if the connection device corresponds to an authentication-free device, exempting the connection device from the authenticating action; wherein
   during the authentication-free determination, it is determined whether or not the connection device corresponds to an authentication-free device based on a device type.

4. The device authentication control method of claim 1, wherein the authenticating action includes sending a seed to the connection device if the connection device does not correspond to an authentication-free device.

5. The device authentication control method of claim 1, wherein the network and the connection device are mounted on a boat.

6. A device authentication control device comprising:
   a connection device connected to a network mounted on a boat;
   a device determination section arranged to determine whether or not the connection device corresponds to an authentication-free device;
   an authentication executing section arranged to perform an authenticating action when the connection device does not correspond to an authentication-free device; and
   an authentication exempting section arranged to exempt the connection device from the authenticating action when the connection device corresponds to an authentication-free device; wherein
   the device determination section is arranged to determine whether or not the connection device corresponds to an authentication-free device based on a device type.

7. A device authentication control device comprising:
   a connection device connected to a network mounted on a boat;
   a device determination section arranged to determine whether or not the connection device corresponds to an authentication-free device;
   an authentication executing section arranged to perform an authenticating action when the connection device does not correspond to an authentication-free device; and
   an authentication exempting section arranged to exempt the connection device from the authenticating action when the connection device corresponds to an authentication-free device; wherein
   the device determination section is arranged to determine whether or not the connection device corresponds to an authentication-free device based on a manufacturer code representing the manufacturer of the connection device.

8. A boat comprising:
   the device authentication control device of claim 6.

9. The device authentication control method of claim 3, wherein the authenticating action includes sending a seed to the connection device if the connection device does not correspond to an authentication-free device.

10. The device authentication control method of claim 3, wherein the network and the connection device are mounted on a boat.

11. A boat comprising:
    the device authentication control device of claim 7.

* * * * *